Figure 1:
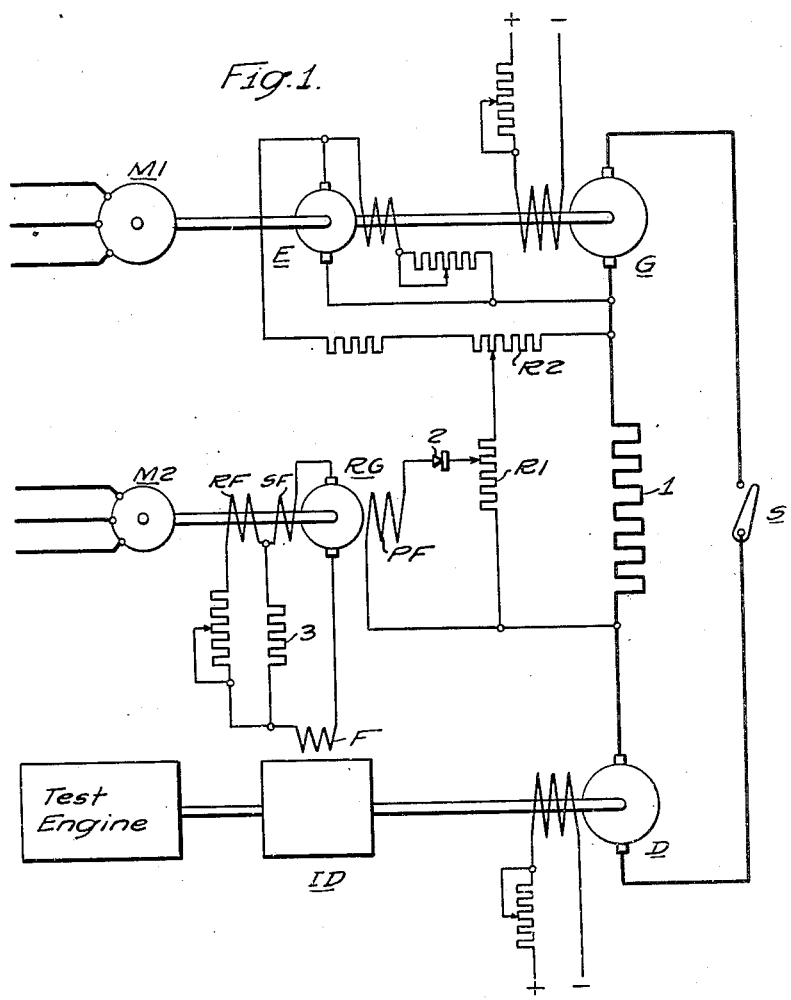

Feb. 17, 1948.    J. R. WRATHALL    2,436,345
DYNAMOMETER CONTROL SYSTEM
Filed Aug. 10, 1945

WITNESSES:
E. A. M'Closkey
E. F. Oberheim

INVENTOR
John R. Wrathall.
BY
Paul E. Friedemann
ATTORNEY

Patented Feb. 17, 1948

2,436,345

UNITED STATES PATENT OFFICE 2,436,345

DYNAMOMETER CONTROL SYSTEM

John R. Wrathall, Pittsburgh, Pa., assignor to Westinghouse Electric Corporation, East Pittsburgh, Pa., a corporation of Pennsylvania Application August 10, 1945, Serial No. 610,081

5 Claims. (Cl. 73—134)

This invention relates generally to dynamometer apparatus of the type utilized in testing engines and more particularly to such apparatus embodying combination load absorbing units comprising close coupled machines of the direct current and eddy current inductor types.

In its more fundamental aspects this invention is related to a copending application of John R. Wrathall et al., Serial No. 610,082, filed on the same date as this application, entitled Control system, and assigned to the same assignee as this invention.

Combination direct current and eddy current inductor dynamometers are commonly employed in testing engines. In such dynamometer arrangements the direct current dynamometer can operate either as a motor or a generator depending upon whether or not the test engine is tending to run slower or faster than the no-load speed of the direct current dynamometer. The inductor dynamometer is utilized only to apply a load to the test engine. When operating as a generator the direct current dynamometer will rapidly change its load with increasing speeds of the test engine. This restricts within relatively narrow limits the variation in speed which can be tolerated without seriously overloading the direct current machine.

When both of the dynamometers are operated together as load absorbing units adjustments must be made to properly distribute the load between the machines. This is conveniently accomplished by controlling the fields of the respective dynamometers to lower the rate of load build up on the direct current machine, with respect to the eddy current machine, or to increase the rate of proportionate load build up on the eddy current inductor dynamometer. Such adjustments either separately or in combination must be made as the speed changes to properly proportion the load between the machines. Certain engine tests require rapid speed changes in test engine operation with proportionate loading between the dynamometers. Under test conditions of this type automatic proportioning of the load distribution must be provided. Further, with automatic load proportioning control there is less likelihood of inconsistency in the accumulated test data.

Thus this invention has for one of its principal objects the provision of dynamometer apparatus of the type involving combination direct current and eddy current inductor dynamometers in which there is obtained automatic proportioning of the load absorbed by each dynamometer unit.

Another object of this invention is to provide a combination direct current and eddy current inductor dynamometer apparatus which is simple in its elements and positive in operation.

A further object of this invention is to provide a dynamometer apparatus of the character referred to in which the eddy current inductor dynamometer is utilized as the principal load absorbing unit with satisfactory load distribution between the machines following as an automatic consequence of proper regulation of the load absorbing capacities of the principal load absorbing unit.

Still another object of this invention is the provision of a dynamometer apparatus in which the principal load absorbing unit is completely unloaded at least during periods when the direct current unit is functioning as a motor.

Energy absorbed by the direct current dynamometer of the combination unit is converted into electrical energy whereas that absorbed by the eddy current inductor machine is converted into heat. The generated electrical energy is readily utilized but the heat energy is usually wasted. In view of this consideration it has been found advantageous to absorb as much energy as possible at the direct current dynamometer before automatically loading the inductor dynamometer to thereby increase the overall efficiency of the system.

Accordingly this invention has for another of its objects the provision of a dynamometer apparatus which is efficient in operation.

More specifically stated it is an object of this invention to provide a dynamometer apparatus of the character mentioned in which automatic load distribution between the direct current machine and the eddy current inductor machine is had of such a character that the maximum load absorbing capacity of the direct dynamometer that is practical is utilized.

Figure 2:
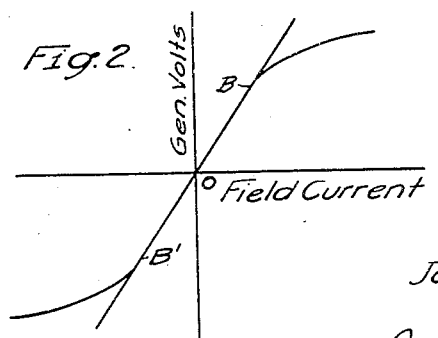

Other objects and advantages will become apparent upon a study of the following specification when considered in conjunction with the accompanying drawing, in which:

Figure 1 is a diagrammatic illustration of a dynamometer system embodying the principles of this invention and Figure 2 is a graphic illustration of the characteristics of the regulating generator embodied in the system.

In general the present invention provides proper load proportioning between the eddy current inductor dynamometer and the direct current dynamometer by producing an electrical quantity proportional to the regenerative load of the direct current dynamometer, producing a second electrical quantity of a magnitude depending upon the maximum regenerative load the direct current machine is to carry, opposing the electrical quantities when the second electrical quantity predominates the first to effect a regulation of the load absorbing capacities of the inductor dynamometer.

This basic operating principle together with other more detailed principles is embodied in the system of Fig. 1 which includes generally: a combination dynamometer assembly of an eddy current inductor dynamometer ID, the rotor of which is mechanically connected to the test engine and a direct current dynamometer D having its rotor connected to the inductor dynamometer ID; a main generator G having its armature connected in a loop circuit including a series resistor 1 and switch S with the armature of the dynamometer D; an exciter E utilized to provide a control quantity for the system depending upon the setting of its rheostat R2; a regulating generator RG which is excited under predetermined operating conditions according to the algebraic sum of the voltages across the resistor 1 and rheostat R2 depending upon the setting of the rheostat R1, the output of the regulating generator being utilized to excite a field F of the inductor dynamometer; and constant speed motors M1 and M2 of which M1 drives the exciter E and the generator G while M2 drives the regulating generator RG. The separately excited field windings of the main generator and direct current dynamometer, while not so shown as a matter of drawing convenience, may be excited from the same source of unidirectional current.

The inductor dynamometer ID and the direct current dynamometer D are illustrated diagrammatically for the purpose of simplifying the illustration of the invention. These units are conventionally connected with their rotors on the equivalent of a common shaft and the shaft is journalled in the respective stators of the machines. A cradle coaxially pivoted with the rotor shaft assembly of the dynamometers carries the stators of these machines. In some units a spring biased torque arm secured at one extremity to the cradle-stator assembly and at its other extremity terminating in pointer which works along a cooperating scale calibrated in lb. ft. of torque, restrains the cradle-stator assembly from unlimited rotation. Thus the torque of the test engine is transferred by the magnetic coupling of the stators and rotors of the dynamometers to the torque arm which moves along the calibrated scale and indicates the torque developed in the dynamometer-test engine assembly.

The direct current dynamometer D is a conventional dynamo which functions both as a motor and a generator in the system depending upon whether the test engine tends to run slower or faster than the no-load speed of the direct-current unit. This machine has sufficient capacity to function as a motor with the inductor dynamometer unloaded or inactive to drive the test engine, for example, to start the engine, run compression tests thereon, etc. Its load absorbing capacity, however, is usually somewhat less than the principal load absorbing unit ID and has a rapidly changing characteristic with increasing speeds.

Eddy current inductor dynamometers are well known to the art. Physically one type of these machines is provided with a rotor member made of magnetic material and having either a toothed or smooth periphery. This rotor is surrounded by an annular stator which carries the exciting coil or winding. Upon energization of the exciting winding with direct current a magnetic flux is produced which links the rotor. The magnetic effects in the machine are such as to produce a sharply rising torque, characteristic over the lower speed ranges of operation. Beyond this low speed range a pronounced knee is formed in the curve. Beyond the knee the curve remains substantially flat indicating a practically constant torque capacity with increasing speeds. This, of course, assumes a constant exciting current in the field. As the strength of the field is increased the torque capacity also increases, the torque characteristic, however, remaining unchanged. This results in a family of curves corresponding to selected values of field strength which are limited only by the magnetic saturation of the machine. Engine tests with the eddy current inductor dynamometer as the load absorbing unit are usually run at speeds where the dynamometer torque absorbing capacity remains substantially constant for a given excitation thereof.

The current output of the direct current dynamometer when it is operating as a generator is practically proportional to the load absorbed thereby and thus may serve as a suitable reference upon which to base automatic regulation of the load absorbing capacity of the inductor dynamometer.

The regulating equipment which controls the excitation of the inductor dynamometer field F to provide load proportioning control includes the regulating generator RG. This generator has special operating characteristics of the nature graphically illustrated in Fig. 2. The generator is provided with three field windings, one, a separately excited pattern field PF so termed because it controls the regulating generator's output, another a series field winding SF which is connected in series with the regulating generator armature, the resistor 3 and inductor dynamometer field F, and finally a regulating field RF which is excited by the voltage drop across resistor 3 and is differentially connected with respect to the pattern field. The resistance of the regulating generator's load circuit or series field circuit is so adjusted that the resistance line thereof, represented by the straight line in Fig. 2, is tangent to the initial straight line portion of the no load saturation curve of the generator. Thus the generator may have a voltage output equal to the ordinate of any of the points of tangency of the curves, for example, the points B and B' and the function of the two fields PF and RF becomes that of locating the proper operating point of the generator along the tangent curves and maintaining that operating point constant for a given control condition. When a control quantity appears across the terminals of the pattern field PF, voltage in the regulating generator rises rapidly because the excitation of the pattern field is added to the effect of the series field. The resulting currents in the armature circuit of the regulating generator energize the differentially connected regulating field RF and equilibrium is reached when the regulating field neutralizes the pattern field, at which point the regulating generator due to its self energizing properties maintains the proper output. Assuming an operating point somewhere along the tangent curves, when the pattern field excitation drops the excitation unbalance is in favor of the regulating field which by its differential action forces the voltage output down along the tangent curves until neutralization of the control fields again results. Should the pattern field increase in excitation the generator voltage rises under its control influence, until the regulating field again neutralizes the pattern field. While the regulating field RF is connected across the resistor 3 in the drawing it will be apparent that it may alternatively be connected across the armature circuit of the regulating generator.

The pattern field winding PF is excited by the voltage drop across the rheostat R1 which rheostat is connected across the tapped portion of rheostat R2 and the resistor 1. Rheostat R2 is energized by the exciter E and has a voltage drop thereacross which is in opposition to the drop across the resistor 1 when the direct current dynamometer D is operating as a generator. The magnitude of the opposition voltage at rheostat R2 is easily set at any suitable value by adjusting the setting of its slider. Similarly the proportion of the differential of the voltages of rheostat R2 and resistor 1 which is to be utilized to excite the pattern field PF is conveniently varied by adjusting the slider along rheostat R1. This results in a change in the ratio of proportionate loading of the two dynamometers. A rectifier 2 is installed in series in the pattern field circuit to pass current through the circuit only when the voltage across rheostat R1 is the result of the voltage across resistor 1, during regenerative periods, overbalancing the voltage at rheostat R2, this expedient being for the purpose of maintaining the inductor dynamometer deenergized when the dynamometer D is functioning as a motor and driving the test engine. With this arrangement compression, resistance and similar engine tests may be made without the addition of the inductor dynamometer drag on the direct current dynamometer. Load response of the inductor dynamometer during such tests would overload the direct current machine and would further render the test results inaccurate. Thus by keeping the pattern field of the regulating generator deenergized during motoring operation of the dynamometer D, the output of the regulating generator is kept at zero and as a consequence the inductor dynamometer is inactive.

The system will be better understood by considering a typical operating cycle in which the test engine is to be tested for power output. Assuming the constant speed motors M1 and M2 are operating and the generating units attached thereto are up to speed with the fields of generator G and dynamometer D properly excited, closure of the switch S applies the generator voltage to the armature of the dynamometer D. Dynamometer D starts rotating and cranks the test engine. When the test engine's torque output and speed rise sufficiently it begins to drive the dynamometer D and regeneration in the armature circuit including resistor 1 takes place with the result that power is fed back into the A. C. system energizing the motor M1. Over the lower power range of the test engine the direct current dynamometer D carries the full engine load, since, at this low operating level the voltage across the rheostat R2 overbalances that across the resistor 1. In view of the rectifier connection at 2 in the pattern field circuit the current resulting from the predominating voltage at R2 is blocked and the pattern field excitation is zero. However with load increases the currents in the armature circuit of dynamometer D sharply rise. At a point approaching permissible loading of the direct current machine the voltage of resistor 1 overbalances that of rheostat 2. Rheostat R1 now assumes a potential having a current direction in the field circuit corresponding to the rectifier polarity and the resulting excitation causes the regulating generator to generate a voltage. Thus a portion of the test engine load depending upon the magnitude of the armature currents of dynamometer D acting as a generator is taken up by the inductor dynamometer ID. The load on the direct current dynamometer now only increases slightly with increases in test engine output up to its maximum, the control of the inductor dynamometer by the regulating generator in response to the direct current dynamometer armature currents being such that the inductor dynamometer absorbs the major portion of the load torque.

The foregoing disclosure and other showings made in the drawing are merely illustrative of this invention and are not to be considered in a limiting sense. The only limitations are to be determined from the scope of the appended claims.

I claim as my invention:

1. Apparatus for testing a prime mover comprising, in combination, an eddy current dynamometer comprising a rotor connected with said prime mover, and including a field winding for varying the dynamometer absorption capacity, a direct current dynamometer having an armature mechanically connected to said prime mover and a field winding, a self energizing generator adjusted so that the line of its load resistance is tangent to the initial straight line portion of the no load saturation curve of the self-energizing generator, said self-energizing generator having a pair of differentially connected control field windings, means for energizing the field winding of the direct current dynamometer, means for energizing the armature winding of the direct current dynamometer, means for energizing one of said control field windings depending upon the load absorbed by the direct current dynamometer, means for energizing the other of said control field windings depending upon the output of the self-energizing generator, and circuit means connecting the self-energizing generator to the field winding of the eddy current dynamometer to effect energization thereof.

2. Apparatus for testing a prime mover comprising, in combination, an eddy current dynamometer having a rotor and a field winding, said rotor being mechanically connected to said prime mover, a direct current dynamometer having an armature winding and a field winding, said direct current dynamometer being mechanically connected with said prime mover to be driven thereby, means for energizing the field winding of said direct current dynamometer, means for energizing the armature winding of said direct-current dynamometer, means for producing a first electrical quantity depending upon the magnitude and polarity of the armature currents of the direct current dynamometer, means for producing a second electrical quantity having a polarity the same as the first quantity when said armature currents result from motoring operation of the direct current dynamometer, means for producing a third electrical quantity which is the algebraic sum of the first and second electrical quantities, means for energizing the field winding of the eddy current dynamometer, and means for causing said last named means to be effective only when said third electrical quantity is the differential of the first and second electrical quantities when the first electrical quantity is larger than the second.

3. Apparatus for testing a prime mover comprising, in combination, an eddy current dynamometer having a rotor and a field winding, a direct current dynamometer having an armature and a field winding, means mechanically connecting the rotor of said eddy current dynamometer and the armature of said direct current dynamometer for mechanical movement with the moving element of said prime mover, means for electrically energizing said armature winding, means for electrically energizing the field winding of the direct current dynamometer, means for producing a first electrical quantity having a magnitude depending upon the regenerative currents in said armature winding, means for producing a second electrical quantity in opposition to the first electrical quantity, and means for energizing the field winding of the eddy current dynamometer depending upon the differential of the first and second electrical quantity when the first electrical quantity predominates the second.

4. Apparatus for testing a prime mover comprising, in combination, an eddy current dynamometer having a rotor and a field winding, a direct current dynamometer having an armature and a field winding, means mechanically connecting the rotor of said eddy current dynamometer and the armature of said direct current dynamometer for mechanical movement with the moving element of said prime mover, a generator having an armature winding and a field winding circuit means connecting the armature of said generator and the armature of said direct current dynamometer in series circuit relation, means for energizing the field windings of the generator and the direct current dynamometer, a first resistor connected in series in the armature circuit of the generator and the direct current dynamometer, an exciter, a second resistor energized by said exciter and having one terminal thereof connected with a terminal of the first resistor, a third resistor connected across both the first and second resistors, the voltage drop across the second resistor being in opposition to the voltage drop across the first resistor when the voltage of the first resistor is the result of regenerative armature currents, a regulating generator, a control field winding for the regulating generator, circuit means including a rectifier unit connecting said control field winding across said third resistor, said rectifier unit being disposed in said control field circuit to pass current therethrough only when the polarity of said third resistor corresponds to the polarity of the first resistor when energized with regenerative armature currents, and circuit means connecting said regulating generator to energize the eddy current dynamometer field winding.

5. Apparatus for testing a prime mover comprising, in combination, an eddy current dynamometer having a rotor and a field winding, a direct current dynamometer having an armature and a field winding, means mechanically connecting the rotor of said eddy current dynamometer and the armature of said direct current dynamometer for mechanical movement with the moving element of said prime mover, a generator having an armature winding and a field winding circuit means connecting the armature of said generator and the armature of said direct current dynamometer in series circuit relation, means for energizing the field windings of the generator and the direct current dynamometer, a first resistor connected in series in the armature circuit of the generator and the direct current dynamometer, an exciter, a second resistor energized by said exciter and having one terminal thereof connected with a terminal of the first resistor, a third resistor connected across both the first and second resistors, the voltage drop across the second resistor being in opposition to the voltage drop across the first resistor when the voltage of the first resistor is the result of regenerative armature currents, a self energizing generator, adjusted so that the resistance line of its load circuit is tangent to the initial straight line portion of the no load saturation curve of the self-energizing generator, a pair of differentially connected control field windings for the self-energizing generator, circuit means including a rectifier connecting one of said control field windings across said third resistor, said rectifier being disposed in said control field circuit to pass current therethrough only when the polarity of said third resistor corresponds to the polarity of said first resistor when energized with regenerative armature currents, means for energizing the other of said control field windings depending upon the output of the self-energizing generator, and circuit means connecting said self-energizing generator to energize the field winding of the eddy current dynamometer.

JOHN R. WRATHALL.

REFERENCES CITED

The following references are of record in the file of this patent:

UNITED STATES PATENTS

| Number | Name | Date |
|---|---|---|
| 2,394,131 | Wrathall et al. | Feb. 5, 1946 |
| 2,298,894 | McDougal | Oct. 13, 1942 |
| 2,367,596 | Maul | Jan. 16, 1945 |
| 2,363,377 | Wrathall | Nov. 21, 1944 |
| 2,335,784 | Montgomery et al. | Nov. 30, 1943 |